J. T. JETER.
GEAR RING FOR ROTARY KILNS.
APPLICATION FILED NOV. 28, 1917.

1,312,252.

Patented Aug. 5, 1919.
2 SHEETS—SHEET 1.

Inventor—
John T. Jeter.
by his Attorneys,

J. T. JETER.
GEAR RING FOR ROTARY KILNS.
APPLICATION FILED NOV. 28, 1917.
1,312,252.
Patented Aug. 5, 1919.
2 SHEETS—SHEET 2.
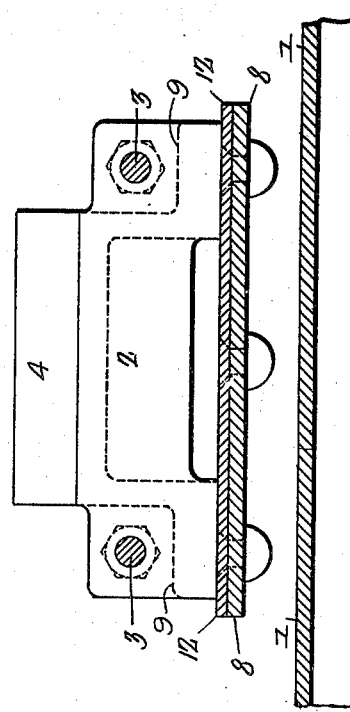
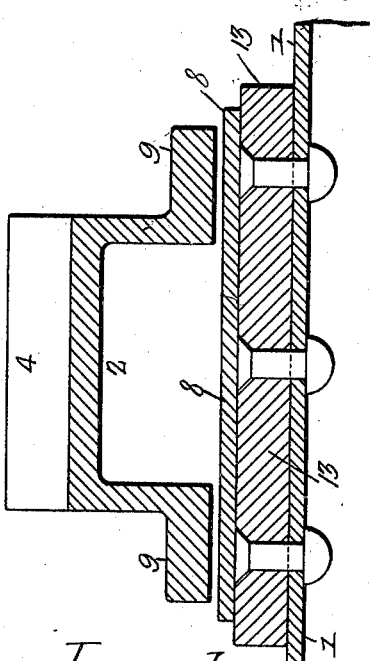
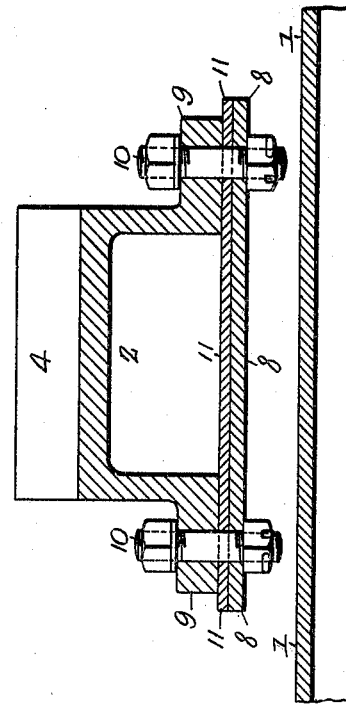
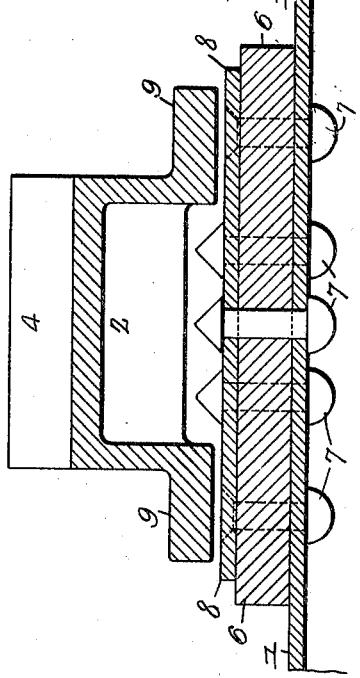
Inventor
John T. Jeter.
by his Attorneys

UNITED STATES PATENT OFFICE.

JOHN T. JETER, OF DALLAS, PENNSYLVANIA, ASSIGNOR TO VULCAN IRON WORKS, OF WILKES-BARRE, PENNSYLVANIA, A CORPORATION OF PENNSYLVANIA.

GEAR-RING FOR ROTARY KILNS.

1,312,252.     Specification of Letters Patent.     Patented Aug. 5, 1919.

Application filed November 28, 1917. Serial No. 204,430.

*To all whom it may concern:*

Be it known that I, JOHN T. JETER, a citizen of the United States, and a resident of Dallas, county of Luzerne, State of Pennsylvania, have invented certain Improvements in Gear-Rings for Rotary Kilns, of which the following is a specification.

This invention relates to certain improvements in the means for connecting a driving gear, riding ring or tire to the drum of a rotating kiln or heater.

The object of the invention is to provide means for allowing the drum to expand or contract without affecting the driving gear ring. This object I attain by flexibly connecting the gear ring to the drum.

In the accompanying drawings:—

Fig. 2, is a section on the line 2—2, Fig. 1;

Fig. 3, is a sectional view on the line 3—3, Fig. 1;

Fig. 4, is a sectional view on the line 4—4, Fig. 1;

Fig. 5, is a sectional view on the line 5—5, Fig. 1;

Figure 1:
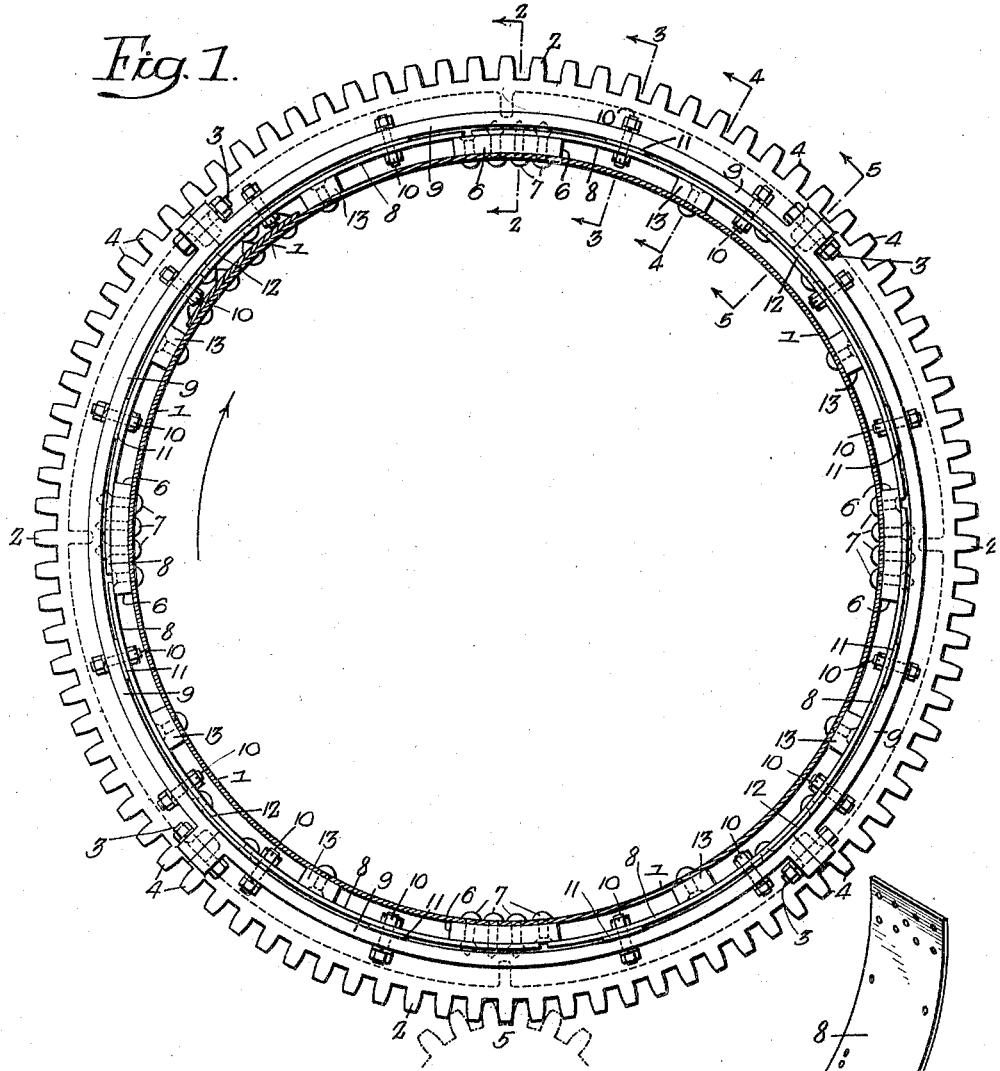
Figure 1, is a sectional view of a rotary cement kiln illustrating the driving gear ring mounted thereon.

Referring to the drawings, 1 is a cylindrical casing, forming the drum of a cement kiln in the present instance. 2 is a gear ring consisting of a series of sections, four in the present instance; the adjoining sections being secured together by bolts 3. 4, 4 are the teeth of the gear ring which mesh with the teeth of the driving pinion 5 shown partly in Fig. 1. The drum is supported on rollers in the ordinary manner and is turned by the pinion 5 through the gear ring 2, which is connected to the casing 1 of the drum.

The drums used especially for cement kilns and driers are generally quite large in diameter and are of considerable length. One end of a drum of a kiln or drier usually extends into the fire chamber of a furnace, while the other end communicates with a flue or chimney so that the flames are carried from the fire chamber through the drum and heat the cement or other material being agitated therein. One or more thicknesses of metal is used at the gear ring, depending considerably upon its diameter, consequently the inner sheet or inner surface of the casing may be at a high temperature, while the outer sheet and gear will be comparatively cool. In the drawings I have shown a single sheet, and in kilns or driers where one or more sheets are used the sheets become hot, therefore, when the gear is bolted rigidly to the casing, there is considerable difference in the expansion and contraction, so that when the segments of the gear are cool they fit close together and when the drum is subjected to heat the segments of the gear are separated at the joints to such an extent, in many instances, as to prevent the proper meshing of the teeth with the pinion.

By flexibly connecting the gear ring to the drum in the manner which I will now proceed to describe, the drum is free to expand and contract without affecting the gear ring or its segments.

Figure 6:
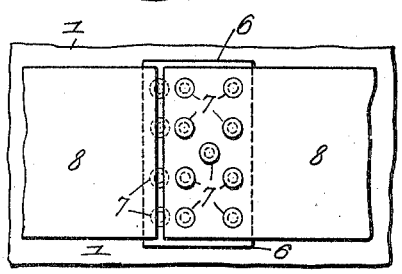
Fig. 6, is a plan view of the anchor block and plate attached thereto, showing the free end of an adjoining plate overlapping the block.
Figure 8:
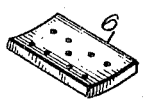
Fig. 8, is a perspective view of one of the anchor blocks.
Figure 7:
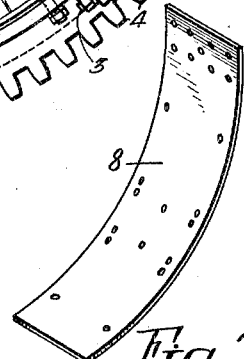
Fig. 7, is a detached perspective view of one of the spring connecting plates.

Secured firmly to the exterior of the drum 1 are four anchor blocks 6. A series of rivets 7 is used in the present instance, but other means of fastening may be employed without departing from the essential features of the invention. Some of these rivets extend through one end of a flexible connecting plate 8 so as to fasten rigidly the end of the plate to the drum. There are four of these plates and they are of such a length that the end of one plate extends over an adjoining anchor block, as clearly shown in Fig. 6. Each plate is secured at intervals to the flanges 9 of the ring 2 by bolts 10 spaced a given distance apart.

Between the plate and the ring at the first and last bolt are narrow separating plates 11, and at the two intermediate bolts, where two sections join, is an extended spacing plate 12 secured to the connecting plate by rivets, as shown. Between the anchor blocks are located bearing blocks 13, which are rigidly secured to the casing by rivets, and the flexible connecting plate rests upon these blocks so as to keep the ring concentric with the drum.

It will be seen by the above construction that while the ring will positively drive the casing, the connection between the ring and casing is flexible so that the casing can expand and contract without affecting the ring. The drum is rotated in the direction of the arrow, Fig. 1, so that the plates 8 are under tension when power is applied.

While my invention is particularly adapted for use in connection with the driving rings of rotary cement kilns, it will be understood that it can be used for driving any rotary drum which is subjected to varying temperatures, and can be used in connecting the tires or riding rings to the drum.

I claim:—

1. The combination in a rotary kiln, of a drum; a driving gear ring mounted on the drum; anchor blocks secured to the drum; a flexible connecting plate secured to each anchor block and to the ring; and means located at intervals between the anchor blocks for spacing the plates so that the driving ring will be concentric with the drum.

2. The combination in a rotary kiln, of a drum; a driving gear ring mounted on the drum and consisting of a series of sections bolted together; anchor blocks secured to the drum; a flexible connecting plate secured to each anchor block, the free end of each plate overlapping an adjoining anchor block; means for connecting the plate between the two anchor blocks to the ring; and means, located at intervals between the anchor blocks, for spacing the plates so that the driving ring will be concentric with the drum.

In witness whereof I affix my signature.

JOHN T. JETER.

Copies of this patent may be obtained for five cents each, by addressing the "Commissioner of Patents, Washington, D. C."